(No Model.)  G. HUNTER & F. LEMAN.  7 Sheets—Sheet 1.
MACHINE FOR POLISHING PINIONS.

No. 312,855.  Patented Feb. 24, 1885.

(No Model.)

G. HUNTER & F. LEMAN.
MACHINE FOR POLISHING PINIONS.

No. 312,855. Patented Feb. 24, 1885.

Witnesses:
Jas. E. Hutchinson
Henry C. Hazard

Inventor:
Geo. Hunter and Frank Leman,
by Prindle & Russell, their Attys (No Model.) 7 Sheets—Sheet 6.

G. HUNTER & F. LEMAN.
MACHINE FOR POLISHING PINIONS.

No. 312,855. Patented Feb. 24, 1885.

Witnesses:
Jas. E. Hutchinson.
Henry C. Hazard.

Inventor:
Geo. Hunter and Frank Leman,
by Prindle and Russell, their Attys (No Model.)  
7 Sheets—Sheet 7.

G. HUNTER & F. LEMAN.
MACHINE FOR POLISHING PINIONS.

No. 312,855.  
Patented Feb. 24, 1885.

Witnesses:  
Jas. E. Hutchinson.  
Henry C. Hazard.

Inventors.  
Geo. Hunter and Frank Leman,  
by Crindle and Russell, their Attys.

UNITED STATES PATENT OFFICE.

GEORGE HUNTER AND FRANK LEMAN, OF ELGIN, ILLINOIS.

MACHINE FOR POLISHING PINIONS.

SPECIFICATION forming part of Letters Patent No. 312,855, dated February 24, 1885.

Application filed August 24, 1883. (No model.)

*To all whom it may concern:*

Be it known that we, GEORGE HUNTER and FRANK LEMAN, of Elgin, in the county of Kane, and in the State of Illinois, have invented certain new and useful Improvements in Mechanism for Polishing Pinions; and we do hereby declare that the following is a full, clear, and exact description thereof, reference being had to the accompanying drawings, making a part of this specification, in which—

Fig. 11$^a$ is a detail plan view of the polishing-blade holder, a portion being broken away to show the construction clearly. Fig. 11$^b$ is a transverse sectional view of the same.

Letters of like name and kind refer to like parts in each of the figures.

In the polishing of watch-pinions it has heretofore been customary to employ machines which were adapted to operate upon but one pinion each, and which, from their construction, required the attendance of skilled high-priced operatives, in order that good work might be done. To render available the use of cheap and comparatively unskilled labor, to increase the quantity and quality of work, and to lessen the cost of the same is the design of our invention.

It consists, principally, in an improved machine for polishing pinions; in the combination, in one organization, of several independently-operating polishing mechanisms, each including a polishing and a holding device; means for operating such mechanisms independently, and means for automatically throwing each one of them out of operation when each leaf of the respective pinion placed in it has been acted upon a predetermined number of times, substantially as and for the purpose hereinafter described.

It consists, further, in a machine for polishing pinions, in which are combined the following elements, to wit: means for holding two or more pinions in position to be operated upon, two or more longitudinally-reciprocating polishers arranged to engage with and move lengthwise of one leaf of each pinion, mechanism whereby the leaves of each pinion are automatically and successively brought into contact with its polisher, and mechanism whereby each pinion-holder is automatically moved away from its polisher whenever the predetermined number of polishing operations have been performed, substantially as and for the purpose hereinafter shown and described.

It consists, further, as an improvement in pinion-polishing machines, in a holder adapted to receive and support a polisher and to engage with and be detached from a reciprocating head, substantially as and for the purpose hereinafter set forth.

It consists, further, as an improvement in pinion-polishing machines, in adjustable mechanism, substantially as shown and described, whereby each leaf of a pinion may be automatically presented to the action of the polisher any predetermined number of times, substantially as and for the purpose hereinafter specified.

It consists, further, in the construction of and means employed for operating the polisher, substantially as and for the purpose hereinafter specified.

It consists, further, in the means employed for holding the pinions while being polished, substantially as and for the purpose hereinafter specified.

It consists, further, in the means employed for rotating the pinions to bring the teeth successively into contact with the polisher, substantially as and for the purpose hereinafter specified.

It consists, further, in the means employed for withdrawing the pinion from contact with the polisher when the desired work has been completed, substantially as and for the purpose hereinafter specified.

It consists, further, in the means employed for gaging the number of successive operations of the polisher, substantially as and for the purpose hereinafter specified.

It consists, finally, in the means employed for compensating for wear in the polisher-operating mechanism, substantially as and for the purpose hereinafter specified.

Figure 1:
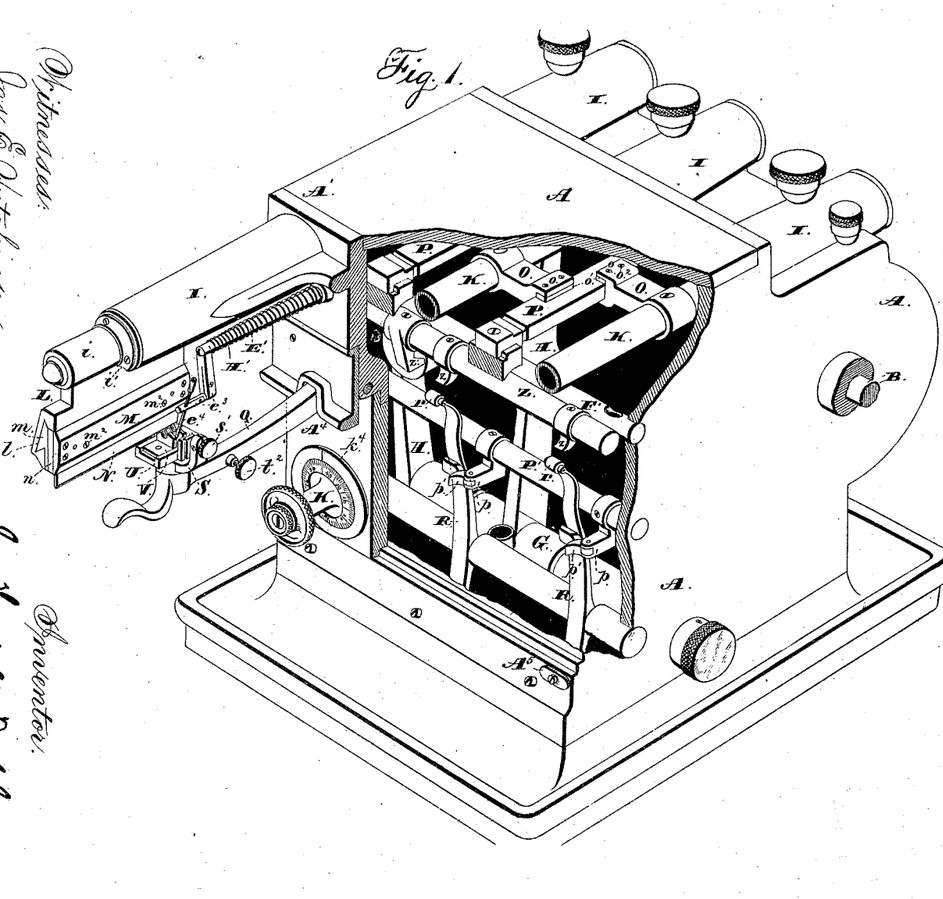
Figure 1 is a perspective view of our machine, a portion of the frame being removed to show the operative parts.
Figure 2:
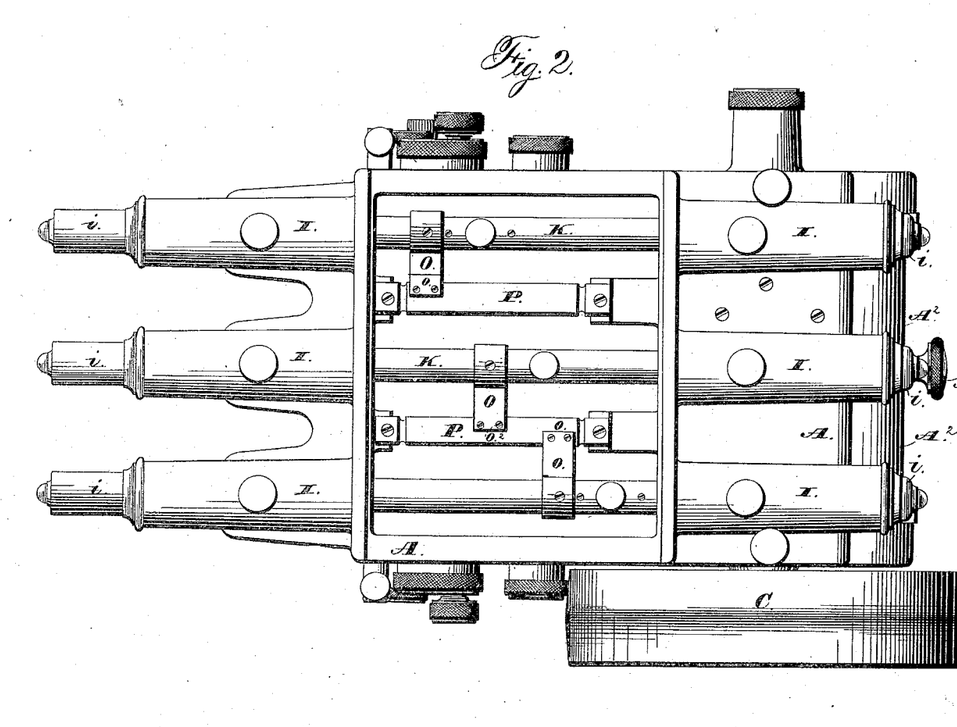
Fig. 2 is a plan view of the upper side of the same, said casing or frame being in part removed.
Figure 3:
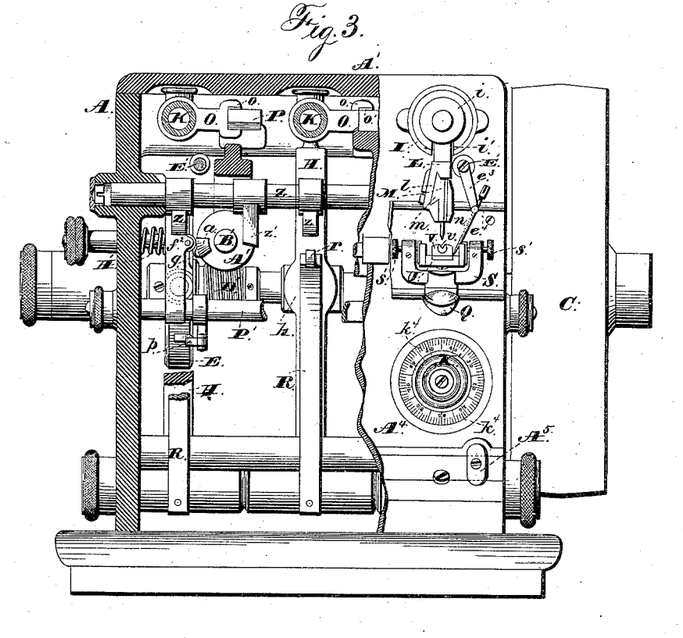
Fig. 3 is a front elevation of said machine.

In the annexed drawings, A represents the case or frame of our machine, which has preferably the form shown in Figure 1, to adapt it without unnecessary bulk to receive the operative parts.

Journaled within the rear portion of the casing A is a driving-shaft, B, which has upon one end a belt-pulley, C, while at points between its bearings in said casing are secured three eccentrics, D, that are each provided with an encircling-strap, E. An arm, $e$, extending radially forward from said eccentric has a round axial opening, $e'$, into which is fitted a correspondingly-shaped rod, F, that upon its outer end is provided with a ball-shaped head, $f$. Said rod is adjustable longitudinally within said arm, and is held in place by means of a set-screw, $e^2$, which passes radially inward through the latter and impinges upon said rod.

Pivoted at one end upon a shaft, G, that rests in suitable bearings near the bottom of the casing A, nearly midway between its front and rear ends, are three bars, H, which thence extend upward nearly to the top of said casing, and at or near their longitudinal centers are each provided with a bearing, $h$, that receives two boxes, $h'$ and $h^2$, which are held in place and moved together by means of two bolts, $h^3$. Said boxes are fitted to and adapted to receive the spherical head $f$ of the rod F, and to furnish for the same a working-bearing, so that the revolution of the shaft B will, through the eccentrics D, straps E, arm $e$, and rod F, cause each of said bars to vibrate upon its said pivotal bearing G.

Figure 4:
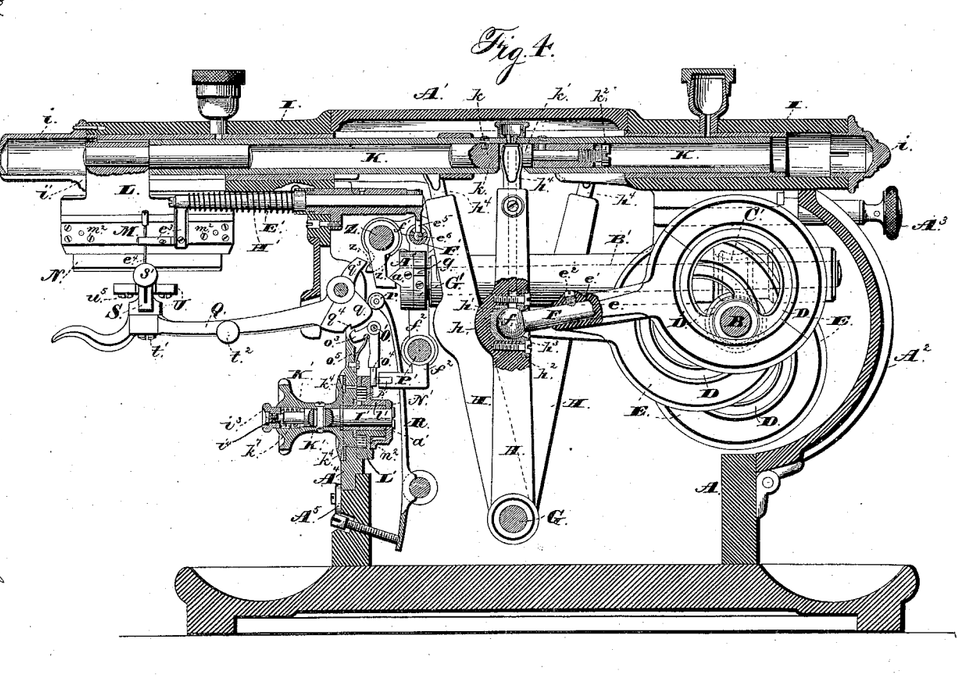
Fig. 4 is a side elevation of the same, the casing and some of the operative parts being shown in section.

At the front and rear ends of the casing A cylindrical bearings I are formed upon the upper side of the same, which bearings are arranged in pairs having the same axis, and each pair is adapted to receive a round bar, K, that is preferably hollow, and at or near its longitudinal center receives the upper end of the bar H, and by the vibratory motion of the latter upon the pivotal bearing G is moved longitudinally within its said bearings I. In order that the wear of parts may be compensated for, each of the bearings I has sufficient diameter to enable it to receive a bushing through which the bar K works, while the connection between the pivoted bar H and the latter is effected by means of a head, $h^4$, that projects upward from said bar H and is provided with curved front and rear faces and a fixed block, $k$, and a movable block, $k'$, which are placed within said rod K and furnish bearings for each of the said curved faces of said head. Said movable block $k'$ is adjusted to position by a set-screw, $k^2$, that bears against its rear end, as shown in Fig. 4.

For the purpose of protecting the operative mechanism and affording ready access to the same, the upper side of the casing A is inclosed by means of a rectangular plate, A′, which fits downward into a corresponding opening at such point. The rear open end of said casing is provided with a vertically-curved plate, A², that is hinged thereto at its lower edge, and at its upper edge has a locking turn-button, A³, and the open front end is inclosed by a plate, A⁴, that is held in place by means of turn-buttons A⁵, which are pivoted to said casing immediately below said opening and extend upward over the lower edge of said plate. The outer end of each cylindrical bearing I is protected by means of a detachable cap, $i$.

The cylindrical bearings I at the front end of the casing A are wholly beyond the front wall of the latter, and each is provided upon or within its lower side with a longitudinal slot, $i'$, that extends from the front end nearly to the rear end of the same. Through said slot projects downward a head, L, that has the form shown in Figs. 1, 3, 4, 10, and 11, and is attached at its upper end to the front end of the bar K, and within one side of its body is provided with a longitudinal groove, $l$, which in cross-section has the form of a dovetail. Each head L is provided with a holder, M, that upon one side has a projection, $m$, which corresponds to and fits within the groove $l$, and thus locks said parts together with sufficient firmness while permitting of their ready separation when necessary. Within the lower side of said holder is provided a narrow slot, $m'$, that extends longitudinally nearly to each end and vertically nearly to the upper side of said holder and receives and contains a correspondingly-shaped polisher, N, which is formed of any suitable soft metal, and at its lower edge is shaped to correspond to the spaces between the leaves of the pinion to be operated upon. Said polisher is held in place by means of two set-screws, $m^2$, which pass inward through the side of said holder and impinge upon a gib, $n$, that is placed between their inner ends and the side of said polisher. If desired, the holder can be made in one piece, the slot $m'$ being cut therein; but we prefer to make the holder, as shown clearly in Figs. 11ª and 11ᵇ, of the two side plates having between them at each end a distance-piece, n'. Through the plates and distance-pieces pass the screws n² n², which serve to bind and hold the parts together. A holder is thus formed having the desired slot m' for the reception of the polishing-blade N, and the gib n. Obviously, if desired, the gib can be dispensed with, and the screws m² m² can bear at their inner ends against the blade itself.

In order that the bars K may be held in circumferential position and lateral movement of the polishers N prevented, each of said bars is provided near its center with a cross-head, O, which extends laterally to and engages with a way, P, that is secured to the casing A parallel with said bar. The engaging end of said cross-head is provided with jaws o, gibs o', and set-screws o², by means of which wear can be compensated for and lost motion prevented.

Figures 5, 6:
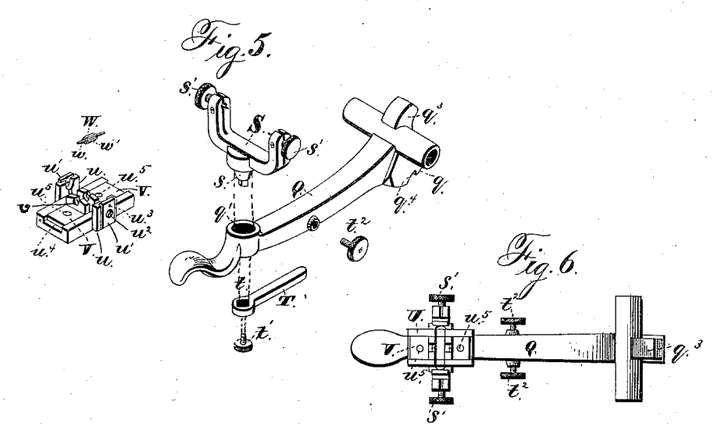
Fig. 5 is a perspective view of the pinion-holding lever and its parts separated from each other.
Fig. 6 is a plan view of the upper side of the same as combined for use.
Figure 7:
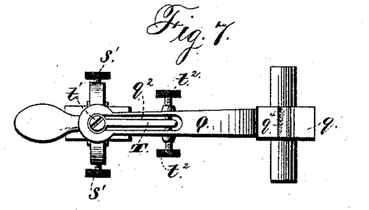
Fig. 7 is a like view of the under side of said parts.
Figure 8:
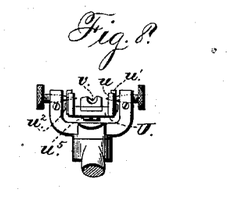
Fig. 8 is a front elevation of the same.
Figure 9:
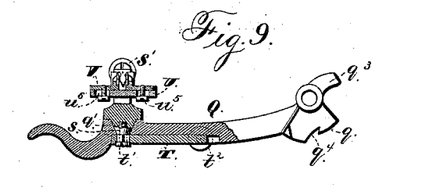
Fig. 9 is a central longitudinal section of said lever and its parts.
Figure 10:
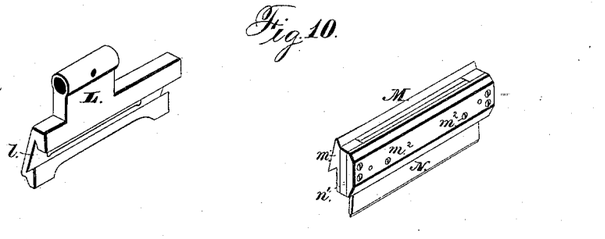
Fig. 10 is a perspective view of the polisher and holder and their operative bar separated from each other.
Figure 11:
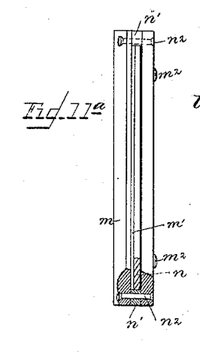
Fig. 11 is a like view of the same as combined for use.
Figure 12:
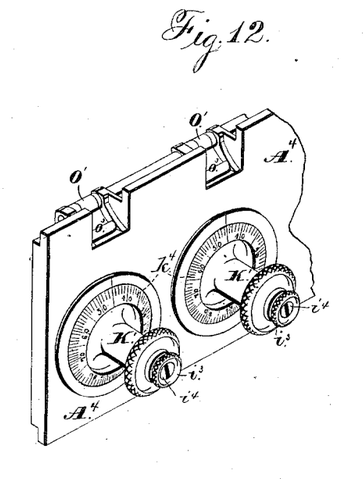
Fig. 12 is a perspective view from the front of the means employed for determining and limiting the movements of the polisher.
Figure 13:
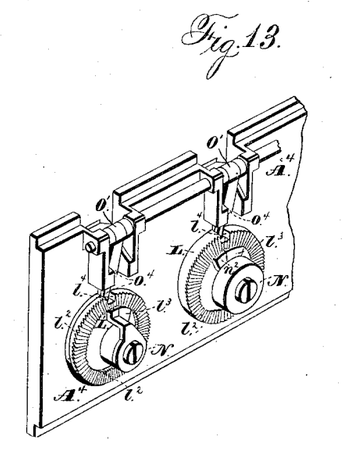
Fig. 13 is a like view of the same from the rear.
Figure 14:
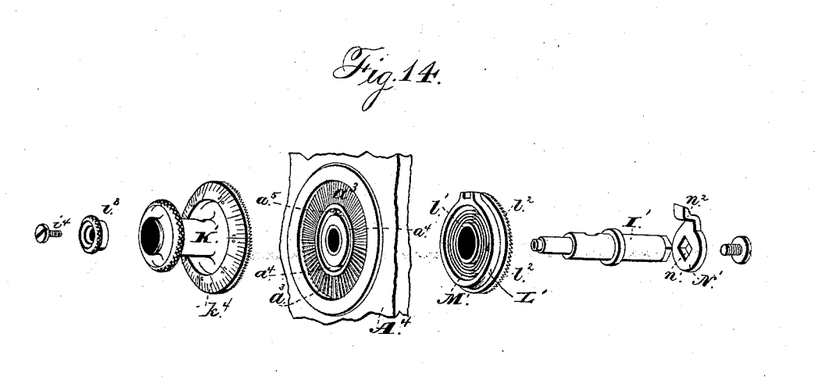
Fig. 14 is a perspective view from the front of said parts separated from each other.
Figure 15:
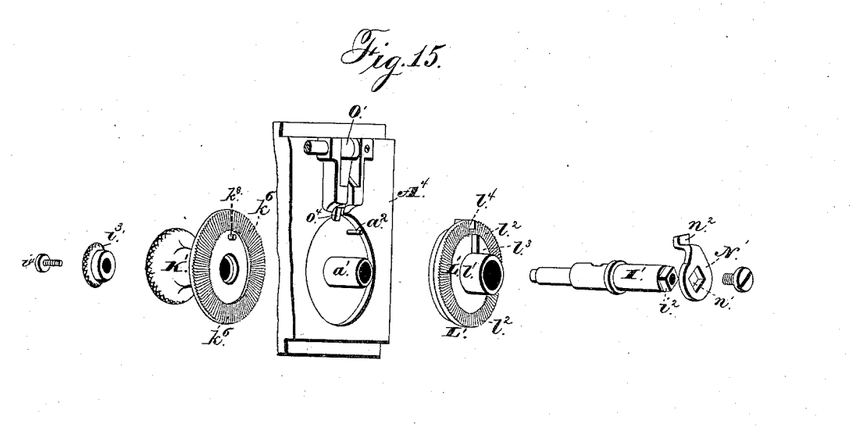
Fig. 15 is a like view of the same from the rear.

The pinions while being polished are held within and presented by the following described mechanism, viz:

Pivoted at one end, beneath each front cylindrical bearing I, is a bar or lever, Q, which has preferably the form shown in Fig. 5, and is capable of being moved in a vertical plane, so as to cause its outer end to be directly beneath the polisher, or at a distance from the same, as desired. Said lever, when raised to a horizontal position, is held upward against said polisher by means of a spring, R, that projects upward from the lower front portion of the casing, and has its upper end, which is provided with a friction-roller, r, in engagement with a cam, q, that is formed upon the rear end of said lever, the arrangement being such that the forward pressure of said spring is exerted upon an upward and outward inclining face of said cam, and produces the effect named.

Within the front portion of the lever Q is a round tapering opening, q', that passes vertically through the same, and receives a correspondingly-shaped spindle, s, which is provided upon the lower side at the center of a U-shaped head, S. The lower end of said spindle is squared and passes through a correspondingly-shaped opening, t, that is formed within one end of a bar, T, where it is held in place by means of a screw, t', which passes upward into its end. Said bar or tail-piece T is contained within a recess, q², that is formed in the lower side of said lever Q, and its rear end is clamped between two set-screws, t², which pass laterally inward through the sides of said recess. The head S is intended to be placed at a right angle to the line of motion of the polisher, and is readily adjusted to the exact position required by means of the set-screws t² acting to move the rear end of the tail-piece T laterally, so as to turn said head upon its axial bearing.

Passing horizontally inward through the upper end of each arm of the head S is a screw, s', which at its inner end is pointed, and in connection with the opposite screw s' furnishes a bearing for a block, U, that has in plan view a rectangular form, and at each side is provided with an upward-projecting centrally-arranged arm, u, which arms engage with said screws, and cause said block to be suspended between and below the same. In order to permit of the ready lateral adjustment of the face of said block U, each arm u is grooved vertically within its outer face, and furnished with a correspondingly-shaped plate, u', which is held in place therein by means of a screw, u², that permits of the vertical adjustment of said plate. The bearing u³, for the end of said screw s', is now formed in said plate instead of said arm. The upper face of the block U has a central right-angled groove, u⁴, within which are placed two angle-pieces, V, that are held in position by means of screws u⁵, which pass upward through said block, and are rendered adjustable toward or from each other by the elongation of the holes u⁶, through which said screws pass. Within the upper end of the vertical arm of each of said angle-pieces is a jeweled notch, v, that is adapted to receive and support one of the pivots, w, of a pinion, W, the opposite pivot of which rests within the bearing v of the other angle-piece, V, while its body is contained within the space between the said angle-pieces.

The construction described permits of the ready adjustment of the holding devices to bring the leaves of the pinion W being operated upon into the exact position with relation to the polisher N that is necessary in order that each portion of the surface to be polished may receive the same action, and all change of the shape of said surface may be prevented.

After each leaf w' of the pinion W has been acted upon by the polisher N, said pinion is automatically moved downward out of contact with the latter, and turned so as to present a new leaf for action, and then moved upward again into contact with said polisher by means of the following described mechanism, viz:

Journaled transversely within the front portion of the casing A is a shaft, Z, which is provided with three downward and forward curving tappet-arms, z, that are arranged immediately in rear of the levers Q, and are each adapted to engage with an arm, q³, which extends in a curve rearward and upward from the rear end of each lever. Near one end of the shaft Z an arm, z', extends downward and rearward, and has its lower end, at its rear side, bearing against the face of a cam, A', which is secured upon and rotates with a shaft, B', that is journaled lengthwise of the casing or frame A. The rear end of said shaft B' is provided with a worm-wheel, C', which engages with and is rotated by means of a worm, D', that is formed upon the driving-shaft B, while upon the face of said cam A' is a ⋀-shaped projection, a, which engages with said arm z', and at each revolution of said shaft B' gives to said arm a quick forward motion, such motion, through said shaft Z and arms $z$ and $q^3$, operating to move downward the outer end of each lever Q.

Journaled at one side of and below each cylindrical bearing I is a shaft, E', which is arranged parallel with the polisher-bar K, and at its front end is provided with a radial arm, $e^3$, that extends downward and thence horizontally forward, and at its said lower front end is adapted to receive a needle, $e^4$. Said needle extends downward beside the pinion W, in which position said end may be caused to engage with a leaf, $w'$, of the latter, if turned inward as said pinion rises into contact with the polisher N.

Upon the rear end of the shaft E' is secured an arm, $e^5$, which extends downward therefrom, and upon its end is provided with a ball-shaped bearing, $e^6$, that fits into and is contained within a correspondingly-shaped recess, $f'$, which is formed in a horizontal bar, F', placed immediately beneath said arm and at a right angle to said shaft. The bar F' is adapted to be moved longitudinally within its bearings, and is provided with a radial arm, $f^2$, which projects downward beside a cam, G', which is secured to and revolves with the shaft B'. Said cam has at one point of its periphery a projection, $g$, that engages with said arm $f^2$, and through the same moves said bar F' longitudinally, such motion operating to secure the hereinbefore-described movement of the needle $e^4$. By properly timing the movements of the cams A' and G' said needle will be turned into engagement with the pinion W as the latter moves upward into contact with the polisher, and will cause said pinion to be rotated one tooth.

The bar F' may be returned to its normal position by means of a spring placed at any suitable point and adapted to produce such action; but we preferably employ a spiral spring, H', that is placed around each shaft E' and has one end secured to the same and the other end secured to the casing A, so as to produce a torsional strain.

In order that pinions having different numbers of leaves may be polished and each leaf receive the same amount of work, it has been found advantageous to provide for each set of devices for holding and polishing a pinion automatically-operating mechanism for controlling such operation, which mechanism is constructed and operates as follows, viz:

Journaled within the removable front portion, $A^4$, of the casing A, and within a hub, $a'$, that extends rearward therefrom directly beneath each polishing mechanism, is a spindle, I', that has secured to its outer end a sleeve, K', which at its outer end has a milled head, and at its inner end is expanded into an indexed plate, $k^4$, and is similar in construction and appearance to the usual knob spindle of a permutation-lock.

Journaled upon the hub $a'$ is a barrel, L', that has a central hub, $l'$, to which is attached the inner end of a coiled spring, M', that has its outer end in turn attached to a pin, $a^2$, which projects rearward from said casing-front $A^4$ into said barrel. The barrel L' is secured in position upon said hub $a'$ by means of a collar, N', which has a square axial opening, $n'$, that fits over the correspondingly-shaped projecting end $i^2$ of the spindle I' and bears against the rear end of said hub. The rear face of the barrel L' has an annular row of radial ratchet-teeth, $l^2$, and between the same and its hub $l'$ is provided with a fixed radial lug, $l^3$, that by the revolution of said barrel is engaged by an arm or stop, $n^2$, which projects forward from the collar N'.

Directly below the pivotal bearing of each lever Q is pivoted a catch, O', which has in side elevation the general form of the letter L, its short arm $o^3$ extended forward beneath said lever, and its long arm $o^4$ extended downward to and bearing against the teeth $l^2$ of the barrel L'. Said arm $o^4$ has its face adapted to engage with said teeth, and being held in contact therewith by means of a spring, $o^5$, operates as a spring-pawl to prevent said barrel from turning in one direction while free to turn in an opposite direction. The upper arm, $o^3$, has a hooked outer end, which is adapted to engage with a notch, $q^4$, that is provided within the lower curved portion of the rear end of the lever Q, when the outer end of said lever has been depressed by the operation of the tappet-arms $z$, but is held out of such engagement by the contact of the lower arm, $o^4$, with the teeth $l^2$ of the barrel L', except when a notch, $l^4$, provided at one point with the periphery of said barrel, coincides with and permits said arm $o^4$ to swing forward and said hook-arm to move upward into engagement with said notch $q^4$. When the catch O' has engaged with the lever Q, the latter is locked in a depressed position, and such operation is intended to take place whenever a pinion has been operated upon by the polisher the predetermined number of times.

Resting in bearings in rear of the catch O', and in the same vertical plane with the bar F', is a similar bar, P', which, like the latter, is adapted to be moved longitudinally within its bearings and is connected with the same by means of the arm $f^2$, that extends downward to and has its lower end secured upon said bar P', and through the cam G' is moved longitudinally simultaneously with said bar F'.

At points in rear of each barrel L' an arm, $p$, extends forward from the bar P', and has pivoted upon its front end a spring-pawl, $p'$, that is adapted to engage with the teeth $l^2$ of said barrel, and by the longitudinal movements of said bar P' to rotate said barrel by successive contact with said teeth.

As arranged, the polishing mechanism will continue to operate until the barrel L' has been rotated, so that the notch $l^4$ coincides with the arm $o^4$ of the catch O', and enables the arm $o^3$ to move upward sufficiently to engage with and lock the lever Q in a depressed position, so that it is only necessary to permit said barrel to turn until the number of teeth in advance of said notch correspond to the number of times that it is desired that the pinion is to be operated upon to render the operation of parts automatic.

The adjustment named is effected by rotating the spindle I' until the arm or stop permits the barrel L' to turn the notch $l^4$ the desired number of teeth beyond the catch-arm $o^3$, after which, through the action of the pawl $p'$, said barrel will be moved rearward one tooth at each depression of the lever Q until said notch $l^4$ coincides with said arm $o^4$ and permits the latter to move forward and the catch $o^4$ to engage with and lock said lever out of contact with the polishing mechanism. The lever Q is released and permitted to move upward, so as to bring its pinion into contact with the polisher by pressing its outer end downward until the arm $o^3$ of the catch O' passes out of the notch $l^4$, when the barrel L' is, by the operation of the spring M', rotated to the limit of its motion in a rearward direction. Said arm $o^3$ rests upon the toothed surface $l^2$ of said barrel, and said catch is held out of engagement with said lever.

In order that the movements of the pawl $p'$ may not continue the rotation of the barrel L' after the catch O' has engaged with and locked in a depressed position the lever Q, the notch $l^4$ of said barrel is made considerably wider than the arm $o^3$, so that the latter is free to turn forward with each movement of said pawl, and is then returned to its former position by the operation of the spring M', such oscillation having no effect upon the connecting parts and continuing until said barrel is released. It is of course necessary that said pawl $p'$ be entirely released from engagement with the teeth $l^2$ at the rear limit of its motion, in order that said barrel may be free to turn rearward when said arm $o^3$ is released from said notch $l^4$.

In order that the spindle I' may be readily locked in position when adjusted thereto, the sleeve K' is connected therewith by means of a pin, $k^5$, that passes radially through said sleeve and through a longitudinal slot, $i^2$, in said spindle, which is elongated sufficiently to enable said sleeve to be moved lengthwise of the latter a short distance. Upon the rear end of said sleeve are provided radial teeth $k^6$, which are adapted to engage with similar teeth, $a^3$, that are formed upon the contiguous face of the plate $A^4$, and said sleeve is held with a yielding pressure at the rear limit of its motion, with said teeth $k^6$ and $a^3$ in engagement, by means of a spiral spring, $k^7$, that is placed around the outer end of said spindle, and is held in position so as to exert a rearward pressure upon said sleeve by means of a washer, $i^3$, and screw $i^4$. To move said spindle, said sleeve must be drawn forward until its toothed rear end is released from engagement, after which said parts may be revolved in either direction. The sleeve K' is designed to make but one revolution with the spindle I', and is limited to such single revolution by a pin, $k^8$, which projects rearward from its rear end into an annular groove, $a^4$, in the plate $A^4$, and when said sleeve has been turned to the limit of its movement in either direction this pin $k^8$ engages with a pin, $a^5$, that is placed within said groove and arrests further motion.

As indicated hereinbefore, and shown in the drawings, there is a separate indicator for each set of holding and polishing devices. In using the machine the operator sets the indicator for each set of holding and polishing devices, so that each leaf of the respective pinion to be polished thereby will be operated upon one or more times by the polisher. After having placed a pinion in each holder and having moved said holder up so as to bring the pinion into contact with the polisher, he gives to it no further attention until, by the locking of the holding-lever in a depressed position, warning is given that the operation is completed, and said pinion is ready to be removed and replaced by another.

In practice each operator attends two machines, in each of which are three polishing mechanisms, six in all, and, commencing at one end, successively inserts a pinion into each and sets the same in operation. By the time that the sixth pinion is placed in position the first has been polished and is ready to be removed and replaced by another, so that practically no time is lost.

Each machine is provided with several sets of holders, M, and polishers N, and while one set is in use the other may be dressed at leisure upon a planer specially adapted for the purpose by an expert, who, without delaying for a moment the polishing operations, can keep in order the polishers for a number of machines. Thus, whenever from wear or injury a polisher becomes unfit for use, the operator has at hand a freshly-dressed supply from which to replace the same.

Having thus fully set forth the nature and merits of our invention, what we claim as new is—

1. As an improvement in machines for polishing pinions, the combination, in one organization, of several independently-operating polishing mechanisms, each including a polishing and a holding device, means for operating such mechanisms independently, and means for automatically throwing each one of them out of operation when each leaf of the respective pinion placed in it has been acted upon a predetermined number of times, substantially as and for the purpose described.

2. A machine for polishing pinions, in which are combined the following elements, to wit: means for holding two or more pinions in position to be operated upon, a longitudinally-reciprocating polisher arranged to engage with and move lengthwise of one leaf of each pinion, mechanism whereby the leaves of said pinion are automatically and successively brought into contact with said polisher, and mechanism whereby each pinion-holder is automatically moved away from its polisher whenever the predetermined number of polishing operations have been performed, substantially as and for the purpose shown and described.

3. As an improvement in pinion-polishing machines, the holder M, adapted to receive and support the polisher N, and to engage with and be detached from the reciprocating head L, substantially as and for the purpose set forth.

4. As an improvement in pinion-polishing machines, adjustable mechanism, substantially as shown and described, whereby each leaf of a pinion may be automatically presented to the action of the polisher any predetermined number of times, substantially as and for the purpose specified.

5. In combination with the bars K, the shaft B, provided with the eccentrics D, the straps E, having the arms $e$, and longitudinally-adjustable rods F, and the bars H, pivoted at their lower ends, connected at or near their longitudinal centers with said rod F, and having their upper ends connected with said bars K, substantially as and for the purpose specified.

6. The lever Q, pivoted at its rear end and held upward with a yielding pressure, the head S, pivoted within the end of said bar, adapted to turn in a horizontal plane, and provided with the pivotal screws $s'$, the block U, suspended from and between said screws, and capable of motion thereon in a vertical plane corresponding to the line of motion of the polisher, and the angle-pieces V, secured to and made adjustable lengthwise of said block, and having each a V-shaped notch for the reception of the pivot of a pinion, substantially as and for the purpose shown and described.

7. In combination with the pinion-holding lever Q, constructed to have its outer end moved automatically downward from and then upward toward the polisher, and means whereby said lever may be thus operated, the shaft E', provided at its front end with the arm $e^3$, carrying a needle, $e^4$, and having at its rear end the arm $e^5$, and the bar F', arranged at a right angle to said shaft, connected with the lower end of said arm $e^5$, and adapted to be moved longitudinally by mechanism, substantially as shown, whereby said needle is automatically moved into engagement with a pinion as the same is being moved upward into contact with the polisher, and is afterward returned to its normal position, substantially as set forth.

8. In combination with the lever Q, pivoted at its rear end, and provided at such point with a cam-face, $q$, arm $q^3$, and notch $q^4$, the spring R, the shaft Z, having the tappet-arms $z$ and $z'$, the cam A', provided with the projection $a$, the pivoted barrel L', containing the spring M', and having the central hub, $l'$, ratchet-teeth $l^2$, and notch $l^4$, the pivoted catch O', having the hooked arm $o^3$ and vertical arm $o^4$, and the bar P', having the arm $p$ and spring-pawl $p'$, and adapted to be moved longitudinally within its bearings, substantially as and for the purposes shown and described.

9. In combination with the spring-barrel L', provided with ratchet-teeth $l^2$, radial arm $l^3$, and notch $l^4$, and with the reciprocating pawl $p'$ and spring-catch O' $o^4$, the journaled spindle I', carrying the collar N' and arm $n'$, substantially as and for the purpose specified.

10. In combination with the spindle I', having the collar N' $n^2$, and journaled within the frame A, which is provided with the annular ring of radial teeth $a^3$, the sleeve K', journaled upon said spindle, and having at its rear end an indexed plate, $k^4$, and radial teeth $k^5$, and means, substantially as shown, whereby said sleeve is adapted to be moved slightly lengthwise of said spindle, and is held with a yielding pressure at the inner limit of its motion, with said teeth $k^5$ and $a^3$ in engagement, substantially as and for the purpose set forth.

11. In combination with the pivoted bar H, provided at its upper end with the head $h^4$, having curved front and rear faces, the bar K, provided with the fixed block $k$, movable block $k'$, and set-screw $k^2$, substantially as and for the purpose shown.

In testimony that we claim the foregoing we have hereunto set our hands this 18th day of May, A. D. 1883.

GEORGE HUNTER.
FRANK LEMAN.

Witnesses:
W. H. CLOUDMAN,
W. P. HEMMENS.